United States Patent
Amend

(10) Patent No.: US 11,974,158 B2
(45) Date of Patent: Apr. 30, 2024

(54) IDENTIFICATION OF CASCADED MULTI-CONNECTIVITY AND MITIGATION OF CASCADED MULTI-CONNECTIVITY INTERFERENCE EFFECTS

(71) Applicant: Deutsche Telekom AG, Bonn (DE)

(72) Inventor: Markus Amend, Nidda (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/042,003

(22) PCT Filed: Dec. 11, 2020

(86) PCT No.: PCT/EP2020/085715
§ 371 (c)(1),
(2) Date: Feb. 17, 2023

(87) PCT Pub. No.: WO2022/037801
PCT Pub. Date: Feb. 24, 2022

(65) Prior Publication Data
US 2023/0354083 A1    Nov. 2, 2023

(30) Foreign Application Priority Data
Aug. 20, 2020   (EP) .................................. 20191927

(51) Int. Cl.
*H04W 88/06* (2009.01)
*H04W 28/02* (2009.01)

(52) U.S. Cl.
CPC ........ *H04W 28/0236* (2013.01); *H04W 88/06* (2013.01)

(58) Field of Classification Search
CPC ............. H04W 28/0236; H04W 88/06; H04W 28/0865; H04W 28/0866; H04L 12/66
See application file for complete search history.

(56) References Cited

U.S. PATENT DOCUMENTS

| | | | |
|---|---|---|---|
| 7,059,769 B1 * | 6/2006 | Potega | B60L 58/25 374/185 |
| 2017/0295104 A1 * | 10/2017 | Hampel | H04W 48/18 |

(Continued)

FOREIGN PATENT DOCUMENTS

| | | |
|---|---|---|
| CN | 110915290 A | 3/2020 |
| WO | 2015118020 A1 | 8/2015 |
| WO | WO-2017182704 A1 * | 10/2017 |

OTHER PUBLICATIONS

Lenovo et al, "Update of Solution #6: MPQUIC-LL steering functionality", vol. SA WG2, No. Elbonia; Aug. 19, 2020-Sep. 1, 2020, Aug. 13, 2020 (Aug. 13, 2020), 3GPP Draft; S2-2004939, 3rd Generation Partnership Project (3GPP), Mobile Competence Centre; 650, Route Des Lucioles; F-06921 Sophia-Antipolis Cedex; France; Retrieved from the Internet: URL:https://ftp.3gpp.org/tsg_sa/WG2_Arch/TSGS2_140e_Electronic/Docs/S2-2004939.zip S2-2004939_MPQUIC-LL_update_v7.doc, XP051919838 [retrieved on Aug. 13, 2020] the whole document.

(Continued)

*Primary Examiner* — Julio R Perez
(74) *Attorney, Agent, or Firm* — LEYDIG, VOIT & MAYER, LTD.

(57) ABSTRACT

A detection unit for discovering cascaded multi-connectivity scenarios in a communication network includes: an interface configured to communicate with the communication network, wherein one or multiple multi-connectivity devices of the network are designed to send type-of-transmission signals to the interface; and an evaluation unit programmed with a cascaded multi-connectivity detection algorithm, wherein the evaluation unit is provided with the type-of-transmission signals and analyzes the occurrence and/or a (Continued)

US 11,974,158 B2

Page 2 possible occurrence of cascaded multi-connectivity usage within the communication network based on the type-of-transmission signals.

14 Claims, 7 Drawing Sheets

(56) References Cited

U.S. PATENT DOCUMENTS

| | | | |
|---|---|---|---|
| 2019/0199619 A1* | 6/2019 | Kucera | H04N 21/6131 |
| 2020/0007664 A1 | 1/2020 | Kanugovi et al. | |
| 2020/0163004 A1 | 5/2020 | Demianchik et al. | |
| 2020/0252839 A1* | 8/2020 | Tang | H04W 8/08 |

OTHER PUBLICATIONS

"3rd Generation Partnership Project; Technical Specification Group Services and System Aspects; Study on access traffic steering, switch and splitting support in the 5G system architecture (Release 16)", 3GPP Standard; Technical Report; 3GPP TR 23.793, 3rd Generation Partnership Project (3GPP), Mobile Competence Centre ; 650, Route Des Lucioles ; F-06921 Sophia-Antipolis Cedex; France, vol. SA WG2, No. V16.0.0, Dec. 19, 2018 (Dec. 19, 2018), p. 1-114, XP051591224, p. 23, paragraph 6.1.7.4-p. 108, paragraph 6.14.3.

Motorola Mobility et al, "New Sol: MPQUIC-LL steering functionality", vol. SA WG2, No. e-meeting; Jun. 1, 2020-Jun. 12, 2020, May 22, 2020 (May 22, 2020), 3GPP Draft; S2-2003788, 3rd Generation Partnership Project (3GPP), Mobile Competence Centre; 650, Route Des Lucioles ; F-06921 Sophia-Antipolis Cedex; France, Retrieved from the Internet: URL:https://ftp.3gpp.org/tsg_sa/WG2_Arch/TSGS2_139e_Electronic/Docs/S2-2003788.zip S2-2003788_ATSSSS_MPQUIC-LL_v4.doc, XP051889812 [retrieved on May 22, 2020].

Motorola Mobility et al, "New Sol: MPQUIC-LL steering functionality", vol. SA WG2, No. E (e-meeting); Jun. 1, 2020-Jun. 12, 2020, Jun. 14, 2020 (Jun. 14, 2020), 3GPP Draft; S2-2004702, 3RD Generation Partnership Project (3GPP), Mobile Competence Centre; 650, Route Des Lucioles; F-06921 Sophia-Antipolis Cedex; France, Retrieved from the Internet: URL:https://ftp.3gpp.org/tsg_sa/WG2_Arch/TSGS2_139e_Electronic/Docs/S2-2004702.zip S2-2004702_3788r07.doc, XP051898998 [retrieved on Jun. 14, 2020] the whole document.

Lenovo et al, "Update of Solution #1: QUIC-LL steering functionality", vol. SA WG2, No. Elbonia; Aug. 19, 2020-Sep. 1, 2020, Aug. 13, 2020 (Aug. 13, 2020), 3GPP Draft; S2-2004938, 3rd Generation Partnership Project (3GPP), Mobile Competence Centre ; 650, Route Des Lucioles ; F-06921 Sophia-Antipolis Cedex; France, Retrieved from the Internet: URL:https://ftp.3gpp.org/tsg_sa/WG2_Arch/TSGS2_140e_Electronic/Docs/S2-2004938.zip S2-2004938_QUIC-LL_update_v7.doc, XP051919837 [retrieved on Aug. 13, 2020] the whole document.

Barmpounakis et al, "Data Analytics for 5G Networks: A Complete Framework for Network Access Selection and Traffic Steering", International Journal on Advances in Telecommunications, vol. 11 No. 3 & 4, 2018, pp. 101-114, http://www.iariajournals.org/telecommunications/.

"3rd Generation Partnership Project; Technical Specification Group Services and System Aspects; Study on access traffic steering, switching and splitting support in the 5G system architecture (Release 16)", 3GPP TR 23.793, Technical Report, V2.0.1, pp. 1-25, 650, Route Des Lucioles; F-06921 Sophia-Antipolis Cedex; France, Dec. 2018.

Omkar Dharmadhikari Wireless Architect, "5G Link Aggregation with Multipath TCP (MPTCP)", CableLabs Member Vodafone Germany Surpasses 21 Million Households with Access to Gigabit Speeds, Aug. 4, 2020, pp. 16-20, https://www.cablelabs.com/cablelabs-member-vodafone-germany-surpasses-21-million-households-with-access-to-gigabit-speeds.

* cited by examiner

IDENTIFICATION OF CASCADED MULTI-CONNECTIVITY AND MITIGATION OF CASCADED MULTI-CONNECTIVITY INTERFERENCE EFFECTS

CROSS-REFERENCE TO PRIOR APPLICATIONS

This application is a U.S. National Phase application under 35 U.S.C. § 371 of International Application No. PCT/EP2020/085715, filed on Dec. 11, 2020, and claims benefit to European Patent Application No. EP 20191927.1, filed on Aug. 20, 2020. The International Application was published in English on Feb. 24, 2022 as WO 2022/037801 A1 under PCT Article 21(2).

FIELD

The present invention relates to the technical field of data transmission over multiple paths in a multi-connectivity communication network, and in particular to detecting cascaded multi-connectivity scenarios in those multi-connectivity networks and reducing cascaded multi-connectivity interference effects.

BACKGROUND

Today a multitude of Internet accesses are available to devices like fixed access (e.g. xDSL), Wi-Fi access (e.g. public Hotspots) or cellular access (e.g. 2G-5G). Those accesses can be provided simultaneously from one or multiple operators. Typically, user equipment (UE) like smartphones or residential gateways (RG) are potentially capable of connecting to multiple accesses simultaneously, but often they do not use multiple path accesses due to the lack of multi-connectivity technologies. Therefore, applications and services end up sticking to one access, unable to benefit from a second available access for higher reliability and speed.

Network protocols that can leverage the potential of multiple accesses like MPTCP, (MP-)QUIC, MPDCCP and SCTP are not widely adopted and require usually an end-to-end implementation. A broad and fast availability is therefore unlikely. Standardized multi-connectivity architectures like 3GPP ATSSS described in "3GPP Technical Specification: 23.501, Version 16.3.0, 22 Dec. 2019" or Hybrid Access as described in "Nicolai Leymann and Cornelius Heidemann and Margaret Wasserman and Li Xue and Mingui Zhang, "Hybrid Access Network Architecture", draft-lhwxz-hybrid-access-network-architecture-02, January 2015" or "BBR Specification TR-348, July 2016" promise to provide remedy and use such protocols between a UE and/or a RG and a access operator network. Furthermore, those measures provide a comprehensive traffic management capability to operators of such network architectures.

ATSSS manages simultaneous connectivity for UEs over cellular (3GPP access) and non-cellular access (untrusted non-3GPP access e.g. Wi-Fi) and is depicted in FIG. 1. BBF ("BroadBand Forum" a standardization gremium) and IETF specify the residential use case, known as the commonly used Hybrid Access. Currently, BBF re-defines Hybrid Access to work with ATSSS, too. Hybrid Access combines therefore fixed access (xDSL or fiber) and cellular access within a RG. Beside access operator driven multi-connectivity solutions, multi-connectivity can also be offered "over the top", terminating the multi-connectivity outside an access operator network, especially terminating the multi-connectivity at a dedicated service like provided by "YouTube".

A mix of the aforementioned multi-connectivity services, working on different layers and/or integration levels and/or operators are possible. Some examples are shown in FIGS. 2-4.

FIG. 2 shows a multi-connectivity end-to-end implementation, e.g. established between an UE and a service in the Internet.

FIG. 3 shows a multi-connectivity implementation between an UE and a provider, which provides an interface towards services in the internet.

FIG. 4 shows a multi-connectivity implementation between a RG and a provider connecting UE and Service.

Possible combinations of the multi-connectivity implementations of FIGS. 2-4 lead to so-called "cascaded multi-connectivity scenarios". In other words, multiple multi-connectivity techniques are applied simultaneously. Some examples of simultaneously applied multi-connectivity techniques are shown in FIGS. 5 and 6. FIG. 5 shows a combination of the multi-connectivity techniques of FIGS. 2 and 3, whereas FIG. 6 shows a combination of the multi-connectivity techniques of FIGS. 3 and 4. Further combinations of multi-connectivity techniques are possible but not shown in the following. An additional complexity is introduced when different multi-connectivity termination points are operated with different independent operators, e.g. UPF1 and UPF 2 as shown in FIG. 6.

FIG. 7 shows components of multi-connectivity devices that make up a typical multi-connectivity unit. Those components comprise a traffic distribution unit, especially a traffic scheduler, that distributes data packets amongst the multiple paths; a path information unit that gains performance information (e.g. latency, available bandwidth) about each of the multiple paths, whereas this path information is being used by the traffic scheduler to distribute data packets accordingly; a reordering unit that reorders the obtained data packets into the right data sequence. For example, each of the devices of FIG. 5 has its individual multi-connectivity unit that is ruled by individual policies taking the path information into account.

Even scenarios with only a single multi-connectivity unit are faced with some challenges to meet design goals like reliability, required bandwidth and or latency. However, cascaded multi-connectivity solution potentially amplifies those challenges because each of the individual multi-connectivity units, associated with different devices, tries to optimize multi-connectivity performance on its own. Hence, this optimization process is not performed in a coordinated manner between the multiple multi-connectivity units, which might lead to a reduced performance or even a complete stall of data traffic. Combining the different multi-connectivity approaches will lead to a chain of the multi-connectivity units in a row or to a "stacked" arrangement if the multi-connectivity solutions are working on a different network layer. In some scenarios, it is even possible to combine the chained with a stacked arrangement.

As an example, the chained scenario could be the application of MPTCP in FIG. 5 between the RG, that can be a home located W-LAN Router, and a network operator, represented by UPF and a further application of MPTCP between the UE and the Service. In this case, the MPTCP paths are operated on the same network layer. An example for the stacked scenario can be the application of a Hybrid Access with GRE encapsulation or MP-QUIC tunnel between the RG and the UPF that is associated to a lower network layer.

Multi-connectivity devices usually comprise multi-connectivity units that enable the multi-connectivity functionality. FIG. 7 shows various components that can make up a multi-connectivity unit. Typically, the user equipment at least comprises a data generator and a scheduler unit, wherein the scheduler unit distributes data packets to multiple communication paths. In addition, the multi-connectivity unit can also comprise a path estimation unit and/or a reordering unit.

Besides the interference of the individual multi-connectivity units (FIG. 7) of the multi-connectivity devices (FIG. 5 or 6), which is caused in a chained or stacked scenario, it can happen that the individual multi-connectivity devices access the same network resources. In the arrangement of FIG. 5, the UE is connected over Wi-Fi (direct link 1) with the RG, which uses cellular connectivity (link 1) to the UPF. At the same time, the UE also uses a cellular connection (direct link 2) to communicate with the service. If both cellular connections belong to the same cellular cell, they compete for the same resources.

Hence, there are basically two types of interferences, namely resource interference and multi-connectivity unit interference.

In the context of this application, the resource interference can happen if multiple devices are competing for the same resources, which will probably lead to a reduction of performance when different "requesters" need to be coordinated.

The multi-connectivity unity interference can become very complex and is depending on many factors but it basically arises because the individual multi-connectivity units do not coordinate their individual actions. As an example, one can assume a scenario of stacked multi-connectivity with an entity and end-to-end MPTCP with a MP-QUIC tunnel transmission within one of its paths. In both protocols, the path estimation relies on congestion control algorithms. The cascaded multi-connectivity can lead to a classical congestion collapse, which is a stable condition that can result in a data throughput that is only a small fraction of the normal data throughput. The associated challenges are dependent on the individual congestion control approach and timer settings, e.g. TCP RTO.

A further impact with respect to the network performance can arise with respect to the applied policies in the reordering unit, which can lead to head-of-line blocking whenever packet loss happens and if that packet loss is directly communicated to both congestion controls, which will lead to the congestion collapse described above.

It might also happen that services that are sensitive to latency but robust to out-of-order delivery are known to the first multi-connectivity device but not to the second multi-connectivity device. In such a case, the second multi-connectivity device could impose an unnecessary delay by the second reordering queue.

Scheduling preferences in one of the multi-connectivity devices can become negated by one of the other multi-connectivity devices, which leads to a bad quality of service when distinct path characteristics are demanded are those interferences can cause high costs, when expensive paths are unnecessarily used.

SUMMARY

In an exemplary embodiment, the present invention provides a detection unit for discovering cascaded multi-connectivity scenarios in a communication network. The cascaded multi-connectivity scenarios comprise possible combinations of multi-connectivity connections as i) a multi-connectivity end-to-end implementation, ii) a multi-connectivity implementation between a user equipment (UE) and a provider, which provides an interface towards services in the Internet, and/or iii) a multi-connectivity implementation between a residential gateway (RG) and a provider connecting UE and service. A combination of multi-connectivity approaches leads to a chain of multi-connectivity units in a row or to a stacked arrangement if the multi-connectivity solutions work on different layers. The detection unit comprises: an interface configured to communicate with the communication network, wherein one or multiple multi-connectivity devices of the network are designed to send type-of-transmission signals to the interface; and an evaluation unit programmed with a cascaded multi-connectivity detection algorithm, wherein the evaluation unit is provided with the type-of-transmission signals and analyzes the occurrence and/or a possible occurrence of cascaded multi-connectivity usage within the communication network based on the type-of-transmission signals.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
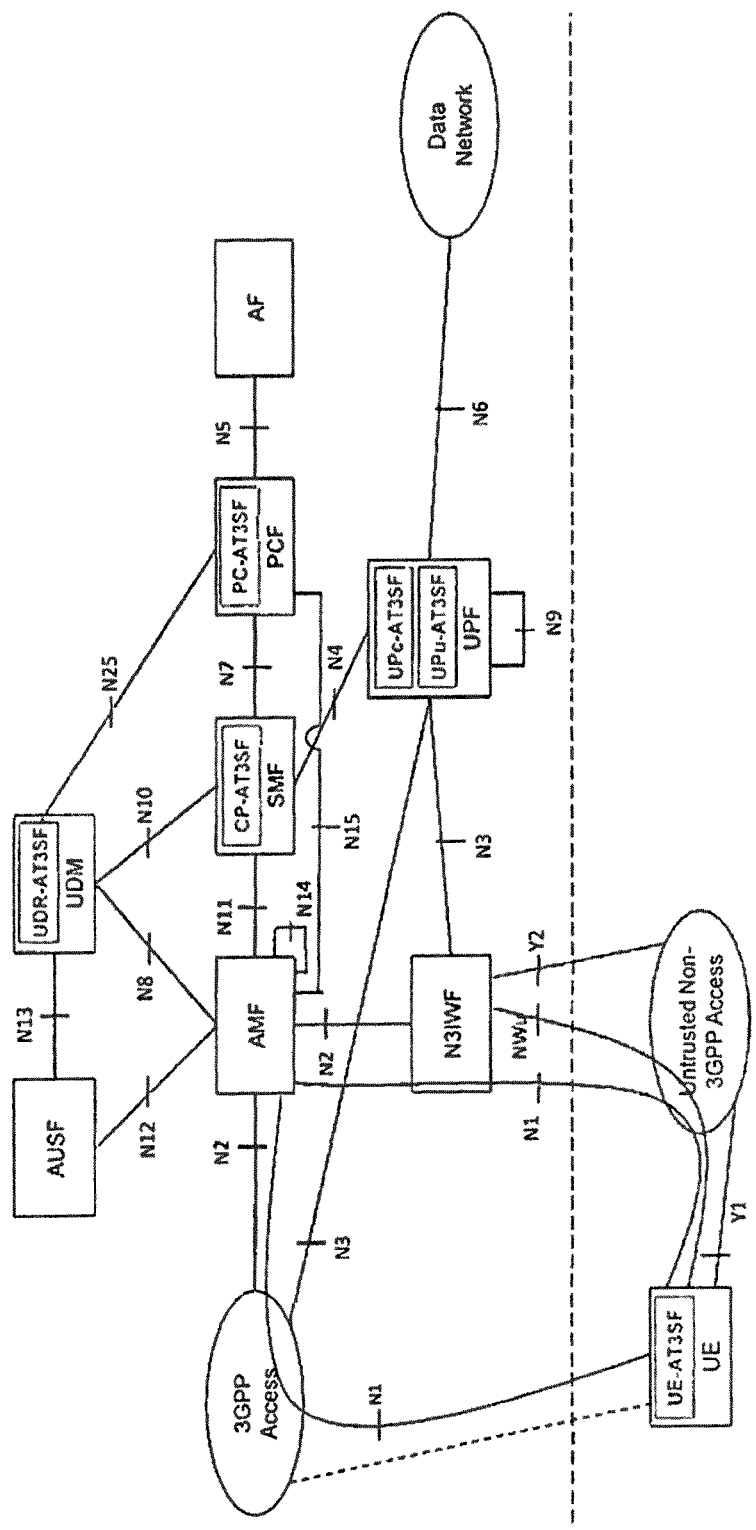
FIG. 1 shows a 3GPP ATSSS architecture integrating multi-connectivity into an access provider network.
Figure 2:
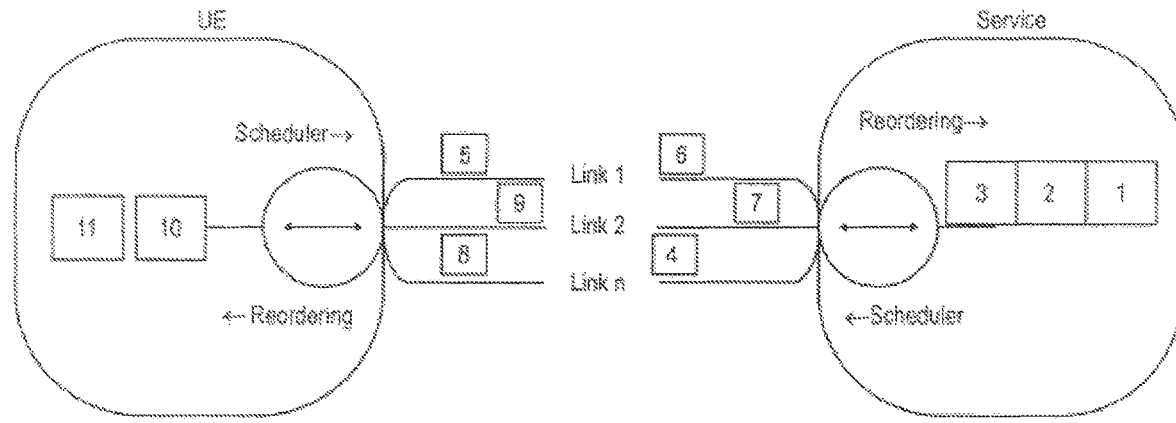
FIG. 2 shows a multi-connectivity user equipment connected to a multi-connectivity service.
Figure 3:
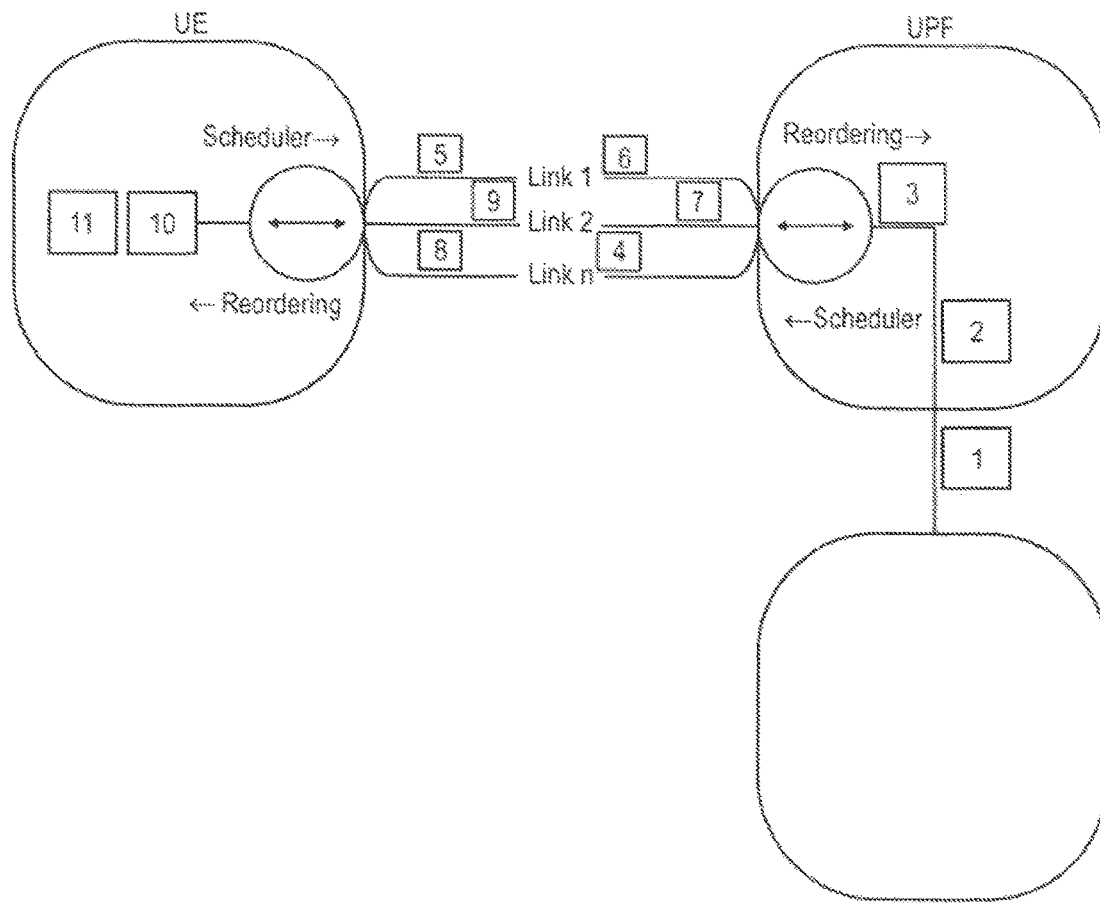
FIG. 3 shows a multi-connectivity user equipment connected to a multi-connectivity network provider.
Figure 4:
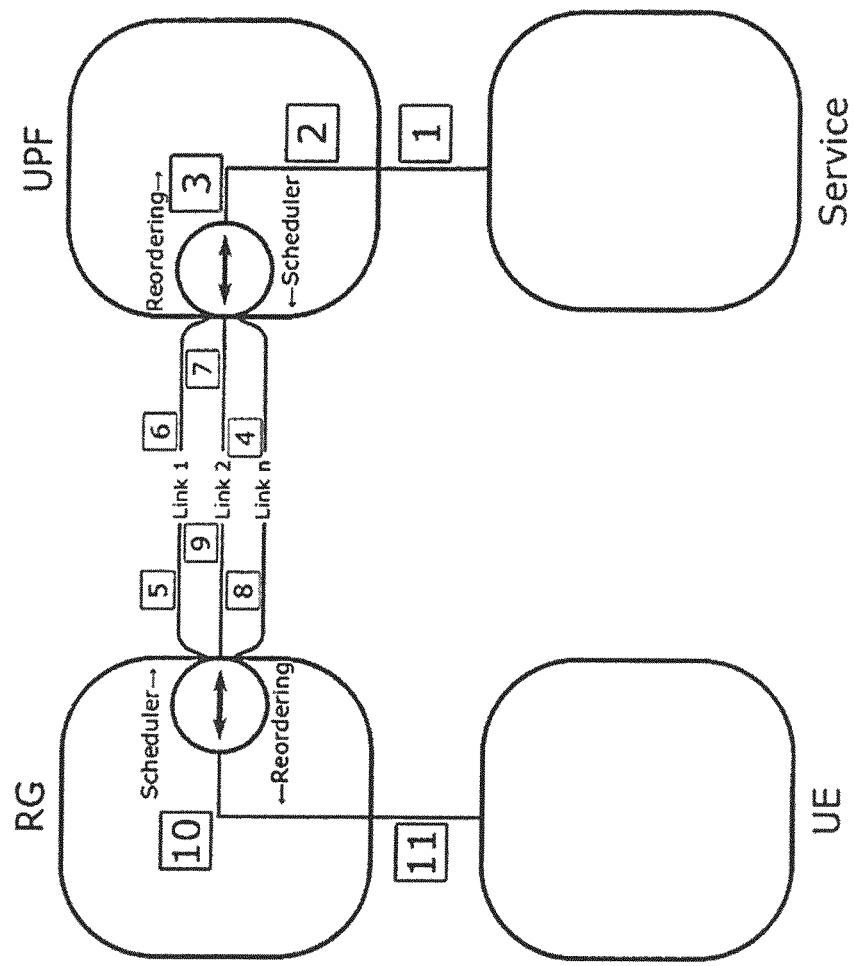
FIG. 4 shows a multi-connectivity residential gateway connected to a multi-connectivity network provider.

Exemplary embodiments of the invention provide techniques to improve multi-connectivity performance in cascaded multi-connectivity scenarios.

According to a first aspect, the invention provides a detection unit to discover cascaded multi-connectivity scenarios in a communication network, the detection unit comprising:

an interface configured to communicate with the communication network, wherein one or multiple multi-connectivity devices of the network are designed to send type-of-transmission signals to the interface; and an evaluation unit programmed with a cascaded multi-connectivity detection algorithm, wherein the evaluation unit is provided with the type-of-transmission signals and analyzes the occurrence and/or a possible occurrence of cascaded multi-connectivity usage within the communication network based on the type-of-transmission signals.

This provides the advantage that cascaded multi-connectivity usage or the possible usage of cascaded multi-connectivity can efficiently be detected by the detection unit. The detection of a possible occurrence of cascaded multi-connectivity offers the benefit that multi-connectivity interferences can be avoided in advance. For example, type-of-transmission signals can be authentication requests of the various multi-connectivity devices, wherein the detection unit concludes from the type of authentication request if a multi-connectivity usage is requested. The multi-connectivity devices are the potential sources that cause cascaded multi-connectivity data traffic with in the communication network. Hence, it is most efficiently if their type-of-transmission signals are used to analyze the occurrence of cascaded multi-connectivity action. These type-of-transmission signals can be signals that are especially generated for the purpose to send them to the detection unit but it is also possible that the type-of-transmission signals is simply the "normal" data traffic of the multi-connectivity devices that is analyzed by the detection unit. Since "normal" data traffic of multi-connectivity usage differs from single path data traffic, it is possible that the evaluation unit detects the occurrence of cascaded multi-connectivity usage based on this normal data traffic. The normal data traffic is usually intended for other network devices than the detection unit. However, the detection unit is configured to at least analyze the necessary information of the normal data traffic in order to evaluate cascaded multi-connectivity usage.

In an embodiment, the detection unit is allocated to one of the multi-connectivity devices and/or is implemented as an independent entity within the communication network.

If the detection unit is allocated to one of the multi-connectivity devices, this provides the advantage that the detection unit can get easy access to the type-of-transmission signals, especially if the type-of-transmission signals is simply the normal data traffic. If the detection unit is implemented as an independent entity within the communication network this provides the advantage, that communication networks can be easily upgraded to connect cascaded multi-connectivity even if the individual multi-connectivity devices do not provide a detection unit. It is a further advantage that an independent implemented detection unit can be easily provided with type-of-transmission signals of all the multi-connectivity devices within the communication network.

Conveniently, the detection unit is implemented in a user equipment, in a network operator server, in a residential gateway RG (like a W-Lan Router) and/or in a network service. The user equipment can be a computer, notebook, a smartphone a tablet or a similar device. The user equipment, the server and the RG can all serve as multi-connectivity devices. Hence, these features provide the advantage that a multi-connectivity device can detect cascaded multi-connectivity usage by itself.

Preferably, the type-of-transmission signals of multipath transmission between two network devices differ from type-of-transmission signals of single path usage between two network devices. This provides the advantage that the evaluation unit is capable to distinguish between single path usage and multipath usage.

In an embodiment, the type-of-transmission signals comprise information about the used multi-connectivity technique. This provides the advantage that the detection unit can easily evaluate the occurrence of cascaded multi-connectivity traffic as well as the associated type.

The detection unit can be configured to send a cascaded multi-connectivity signal via the interface to the communication network upon the detection of cascaded multi-connectivity by the algorithm. This provides the advantage that other network devices, especially the multi-connectivity devices, with in the communication network get the information about occurrence of cascaded multi-connectivity usage.

According to a second aspect, the invention provides a method to discover cascaded multi-connectivity scenarios in a communication network comprising the following steps:
Implementing a detection unit as described above into the communication network, wherein the communication network comprises one or multiple multi-connectivity devices;
Transmitting type-of-transmission signals from at least one or multiple multi-connectivity devices to the detection unit; and
Analyzing by the detection unit if the type-of-transmission signals indicate a usage of cascaded multi-connectivity within the communication network.

This provides the advantage that cascaded multi-connectivity usage can efficiently be detected by the detection unit in communication networks.

According to a third aspect, the invention provides a multi-connectivity communication network configured to establish efficient data traffic between network devices comprising:
at least two multi-connectivity devices, wherein the at least two multi-connectivity devices each comprise multi-connectivity units and transmit data via the multi-connectivity communication network (the multi-connectivity units comprise a data generator, scheduler unit, a path estimation unit and/or a data-reordering unit);
a controlling unit configured to send steering signals to at least one of the multi-connectivity units (the controlling unit can unit be allocated to one of the multi-connectivity devices and/or can be implemented as an independent entity within the communication network); and
a detection unit as described above to discover cascaded multi-connectivity scenarios in the communication network, wherein the detection unit is configured to send a cascaded multi-connectivity signal via its interface to the controlling unit, wherein an algorithm of the controlling unit is configured to generate the steering signals based on the multi-connectivity signal.

This provides the advantage that the communication network is able to gain information about cascaded multi-connectivity usage and to adapt the performance of the multi-connectivity units by creating respective steering signals. As explained above, cascaded multi-connectivity is likely to result in reduced overall network performance. In that the controlling unit generates steering signal based on the multi-connectivity signal, measures can be taken to improve the network performance. For example, congestion control within the multi-connectivity units can in the worst case lead to a complete stall of data traffic within the communication network (or at least within parts of the communication). Hence, the steering signal can rule one or every multi-connectivity unit of the communication network to switch off their respective congestion control. At least some of the network devices can serve as the multi-connectivity device. For example, it is a common use case that users access communication network with their smartphone. Modern smartphones are commonly built to work as a multi-connectivity device.

Preferably, the multi-connectivity units comprise a traffic scheduler, a path information unit and/or a reordering unit. This provides the advantage that the multi-connectivity units can efficiently control and distribute data traffic over multiple data paths, especially over heterogeneous data paths with different transmission protocols. In addition, this provides the advantage that the steering signals can control different entities within the multi-connectivity unit that have a different impact on the network performance, which can result in an individual control of the network performance.

In an embodiment, the network devices are a user equipment (e.g. smartphones, tablets, and notebooks), a residential gateway, an operator gateway (e.g. a BNG) and/or servers. This provides the advantage that the network devices can also work as multi-connectivity devices.

The steering unit can be configured to send the steering signals to selected multi-connectivity devices, to some or to all selected multi-connectivity devices of the network. This provides the advantage of having a full flexibility in controlling the multi-connectivity devices. If only a single multi-connectivity device needs to be supplied with a new steering signal then the appropriate steering signal is only sent to that specific multi-connectivity device. If there is a need that only a subset of the multi-connectivity devices need to adapt their multi-connectivity usage in order to enhance the network performance than the appropriate steering signals are sent to those multi-connectivity devices. In that sense, it is possible to create an individual steering signal for each of the multi-connectivity devices.

In an embodiment, the steering signal comprises information to reduce the usage of multi-connectivity techniques within the communication network. This provides an efficient measure to reduce the interference that occurs in cascaded multi-connectivity scenarios. If one of the multi-connectivity devices switches from multipath usage to single path usage this can lead in total removal of the disadvantageous interference effects. Hence, the network performance will be improving.

According to a fourth aspect, the invention provides a method to control the usage of multi-connectivity techniques in a multi-connectivity communication network as described above comprising the following steps:
  Establishing a communication network between network devices, wherein at least two of the network devices are multi-connectivity devices;
  Transmitting type-of-transmission signals from at least one or multiple multi-connectivity devices to the detection unit of the communication network;
  Analyzing by the detection unit if the type-of-transmission signals indicate a usage of cascaded multi-connectivity within the communication network;
  Sending a cascaded multi-connectivity signal upon detection of cascaded multi-connectivity by the detection unit to the controlling unit; and
  Generating of steering signals based on the multi-connectivity signal by the controlling unit, wherein the controlling unit sends the steering signals to at least one of the multi-connectivity devices, wherein the at least one of the multi-connectivity devices adapts its multi-connectivity activity based on the steering signals.

This provides the advantage that the communication network is able to gain information about cascaded multi-connectivity usage and to adapt the performance of the multi-connectivity units by creating respective steering signals.

In an embodiment, the multi-connectivity activity is adapted to increase the communication network performance. Especially, the multi-connectivity activity is deactivated, bypassed and/or modified.

This provides the advantage of having effective measures to reduce the interference effects of cascaded multi-connectivity.

In the following, numerous features of the present invention are explained in detail via preferred embodiments. The present disclosure is not limited to the specifically described combinations of features. Rather, it will be appreciated that the features mentioned here can be combined in other ways without departing from the scope of the present application, unless this is expressly excluded below.

Figure 5:
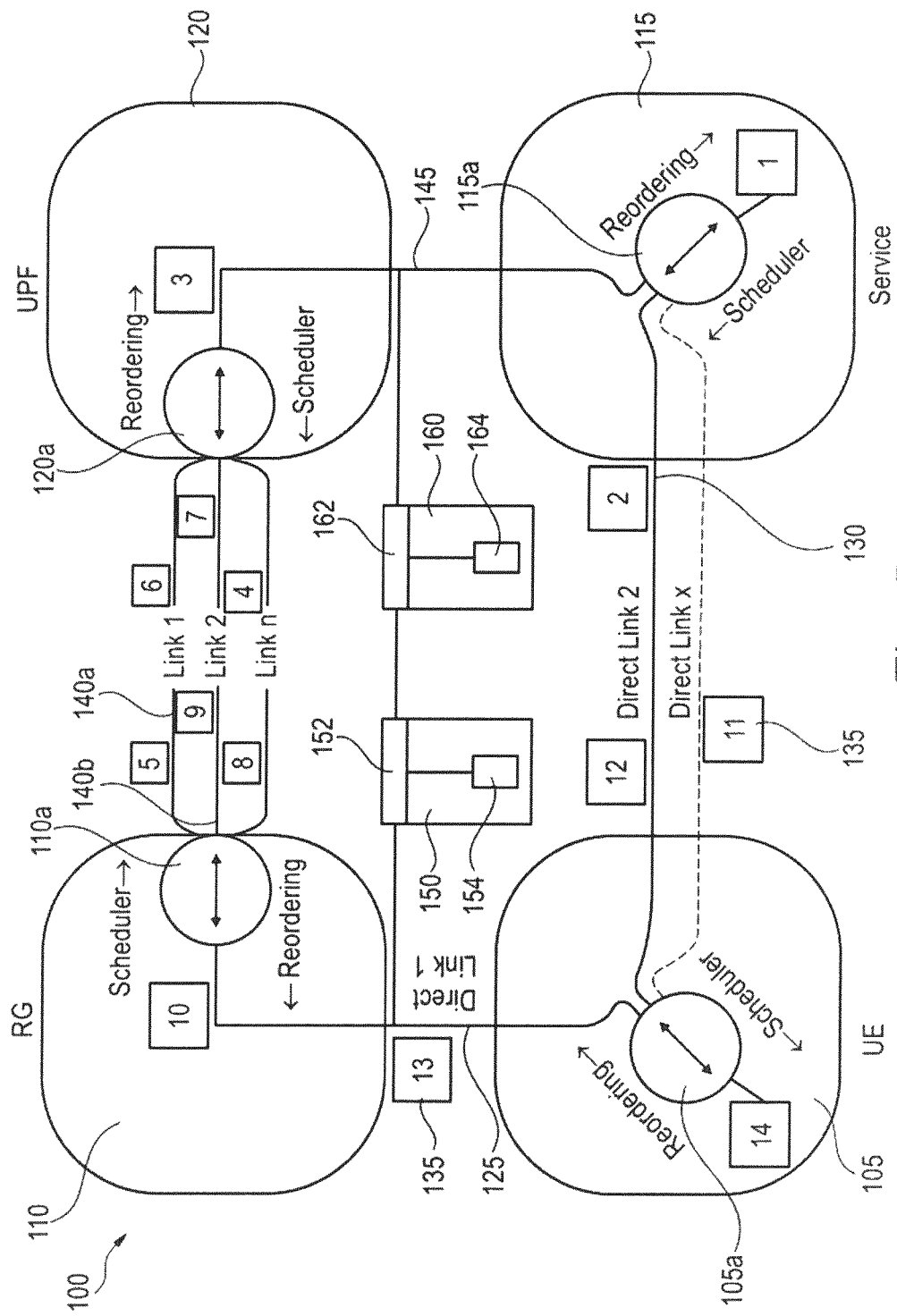
FIG. 5 shows a combination of FIGS. 2 and 4.

FIG. 5 shows a communication network 100 according to the invention. The communication network 100 comprises four network devices 105, 110, 115, 120. All network devices of FIG. 5 are multi-connectivity devices and each comprise a respective multi-connectivity unit 105a, 110a, 115a, 120a. A smartphone 105 of the user is connected via a first direct link 125 to residential gateway RG 110, for example, the first direct link 125 can be a W-LAN link. Via a second direct link 130, the smartphone 105 is connected to a service 115 of the communication network, wherein the communication network can be the Internet and wherein the second direct link 130 can be a cellular link. The service 115 can run on a multi-connectivity capable server. The smartphone 105 exchanges data packets 135 with the other network devices directly or indirectly over one of the first or the second direct link 125, 130.

The RG 110 is being connected over at least two links 140a, 140b to a network provider 120, wherein one of the links can be a fixed line link 140a and the other links can be a cellular link 140b. The cellular links within the context of this description can be of the LTE or 5G type. The multi-connectivity capability of the network provider 120 can be implemented in an appropriate server system. The network provider 120 is connected via a remote link 145 to the service 115, wherein the remote link 145 can be a peering through an autonomous system (AS) link.

The communication network 100 further comprises a detection unit 150 and a controlling unit 160. The detection unit 150 and the controlling unit 160 are connected to each other and to the communication network 100 via, e.g., cellular, Wi-Fi, fixed line. The detection unit 150 comprises a communication interface 152 and a processor 154 that serves as an evaluation unit and is programmed with an algorithm that is capable of detecting multi-connectivity usage. Upon detecting cascaded multi-connectivity within the communication network 100, the detection unit 100 sends a multi-connectivity signal to the controlling unit 160. The controlling unit 160 comprises a communication interface 162 and a processor 164 that is programmed with an algorithm to generate steering signals for at least one the multi-connectivity units 105a, 110a, 115a, 120a upon receiving the multi-connectivity signal. These steering signals can change the functionality of the respective multi-connectivity unit 105a, 110a, 115a, 120a.

Figure 6:
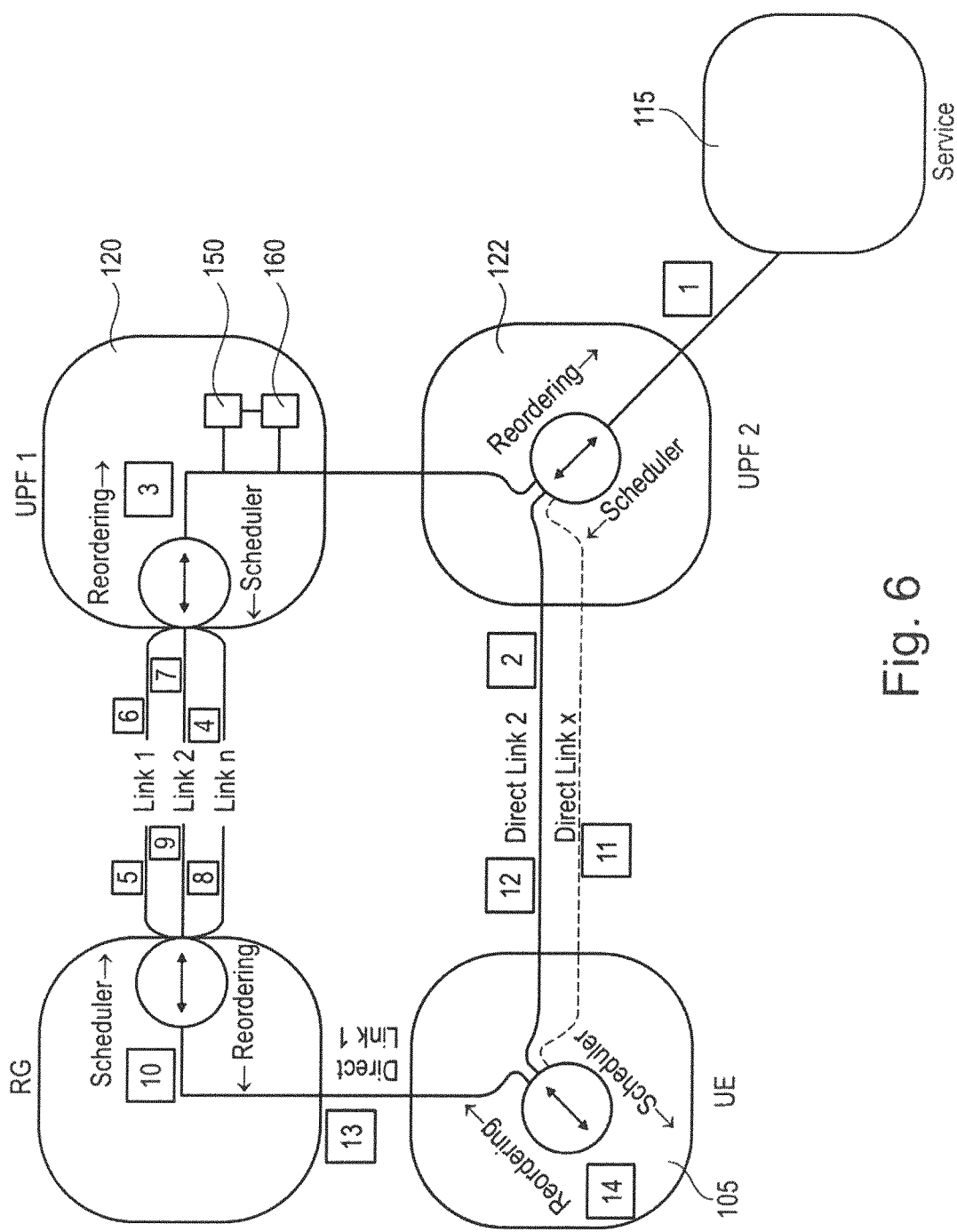
FIG. 6 shows a combination of FIGS. 3 and 4.
Figure 7:
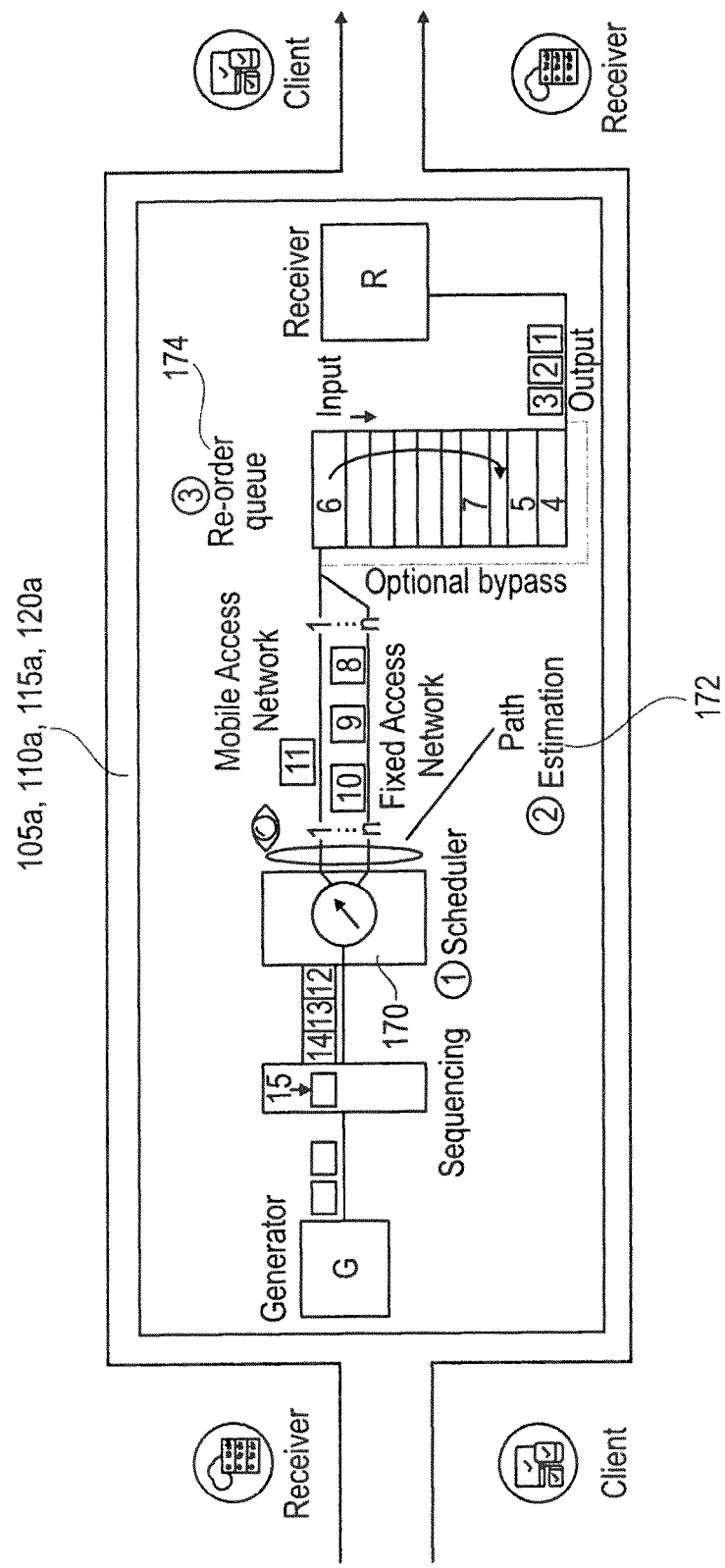
FIG. 7 shows a multi-connectivity unit of a multi-connectivity device.

FIG. 6 differs with respect to FIG. 5 in that the neither the network provider 120 nor the smartphone 105 are directly connected the service 115 but that they are indirectly connected to the service 115 via a second network provider 122. This can occur if the user of smartphone has different network providers for his cellular and his DSL access to the Internet. Another difference of FIG. 6 with respect to FIG. 5 is that detection unit 150 and the controlling unit 160 are now associated to one of the multi-connectivity devices, in this case implemented into the network provider 120.

The invention provides mechanisms to detect potential cascaded multi-connectivity scenarios and applies appropriate countermeasures when the overall performance cannot be guaranteed.

In the following, possible scenarios are described in which cascaded multi-connectivity is likely to happen. These scenarios can happen in communication systems shown in FIG. 5 and/or FIG. 6.

Multi-connectivity can be based on the ATSSS network architecture of FIG. 1. A typical case as shown in FIG. 6 is if the user uses his user equipment, especially his smartphone 105, at home where he has also access to his local W-LAN. The smartphone 105 serves as a multi-connectivity device and can connect to the service 115 via a cellular link 130 and simultaneously to the RG 110 of the home network via a W-LAN link 125. As the RG 110 itself is also a multi-connectivity device it can communicate over multiple paths with the network provider 120, in this case the RG 110 communicates with a network provider via a DSL link 140a and a cellular link 140b. The user equipment 105 and the RG 110 can be managed by different network operators 120, 122 as shown in FIG. 6. The case of different network operators 120, 122 typically happens if the RG 110 is provided with a data plan from a first network operator 120, different relative to the data plan provided to the UE 105 from a second network operator 122. In another scenario, the user is abroad and the "home" provider of the user has a roaming agreement with a foreign network provider abroad. The roaming agreement allows the communication with the foreign network provider. Both network operators 120, 122 can support ATSSS.

Multi-connectivity can be based on "Non-ATSSS" solutions. A possible example is if the RG 110 uses a common "Hybrid Access" based on GRE solution and the UE 105 uses an end-to-end connection, for a MPTCP data link, to communicate with the service 115. In this case, the UE 105 and the RG 110 can be managed by different operators 120, 122.

Multi-connectivity can also be based on a mixture of "ATSSS" and "Non-ATSSS" solutions as shown in FIG. 6. A possible example is if the RG 110 uses a common "Hybrid Access" based on GRE solution and the UE 105 uses a cellular link within the ATSSS architecture to communicate with the UPF2 122. For these cases, the UE 105 can be managed by the same or by different operators.

It is the task of the detection unit 150 to discover cascaded multi-connectivity usage within the settings described above. Possible mechanisms to determine the usage of multi-connectivity techniques are:

i) UE 105 internal signaling: The UE 105 creates internal signals that indicate multi-connectivity usage, which can happen if multi-connectivity is offered from an ATSSS capable network operator and the UE 105 itself employs for example MPTCP based services end-to-end. This leads to an interference of two different multi-connectivity solutions. For this case, it might be preferential to allocate the detection unit 150 in the UE 105. The detection unit 150 receives information about the ATSSS capability of the network provider and about the MPTCP usage. Hence, the multi-connectivity detection algorithm of the detection unit 150 can conclude the occurrence of cascaded multi-connectivity usage within the communication network based on type-of-transmission signals.

ii) ATSSS "internal" signaling: Both the RG 110 and the UE 105 use the same ATSSS network provider 120 and are both ATSSS capable within the ATSSS network of the network provider 120. If both the RG 110 and the UE 105 use the ATSSS solution for multi-connectivity purposes, appropriate type-of-transmission signals are generated at the ATSSS network provider 120. In other words, the ATSSS network provider 120 "knows" about the simultaneous usage/request of multi-connectivity. The ATSSS network provider 120 can gain this knowledge by sending the type-of-transmission signals of the RG 110 and the UE 105 to the detection unit 150. If both type-of-transmission signals can contain certain ATSSS transmission information, the multi-connectivity detection algorithm of the detection unit 150 can conclude the occurrence of cascaded multi-connectivity usage within the communication network. For this case, it might be preferential to allocate the detection unit 150 at the network provider 120.

The detection unit 150 can also be implemented within an authentication unit. The authentication requests of the multi-connectivity devices and can represent appropriate type-of-transmission signals to detect an occurrence or a possible occurrence of cascaded multi-connectivity.

iii) ATSSS "external" signaling: This can be the case of FIG. 6, when the UE 105 and the RG 110 connected to different network providers 120, 122. Both the UE 105 and the RG 110 can use the ATSSS multi-connectivity approach to transfer data packet over multiple paths. Since they are both operated by different network providers, one of these network providers itself is not able to determine the existence of cascaded multi-connectivity usage simply because of the missing information. However, if both the network providers 120, 122 send their respective type-of-transmission signals to the detection unit 150, the multi-connectivity detection algorithm of the detection unit 150 can conclude the occurrence of cascaded multi-connectivity usage within the communication network. For this case, it might be preferential to allocate the detection unit 150 within at least one of the network providers 120, 122 and to establish a communication interface between the two network providers so that both can send their respective type-of-transmission signals to the detection unit 150.

iv) Multi-connectivity network protocol specific features: The multi-connectivity detection algorithm of the detection unit 150 can use "deep packet inspection" (DPI) and/or routing information to detect the usage of a multi-connectivity service. For example, the algorithm can detect an IPsec protocol used within the ATSSS architecture for a Wi-Fi path or a N3IWF IP addresses.

However, the simple detection of cascaded multi-connectivity usage does not lead to an enhanced overall network performance that was degraded by the described multi-connectivity interferences. Counter measurements are to be applied. The performance of the network is mainly degraded due to the fact that the interferences cause problems with in the respective multi-connectivity units 105a, 110a, 115a, 120a because multiple multi-connectivity units are running in parallel; to be more specific, the interferences cause problems for the functionality of a traffic scheduler 170, a path information unit 172 and/or a reordering unit 174 of the respective multi-connectivity unit.

To trigger the counter measurements, the detection unit 150 sends upon detecting cascaded multi-connectivity a cascaded multi-connectivity signal to the controlling unit 160. The controlling unit 160 generates steering signals and sends them to at least one of the multi-connectivity units to adapt/change their respective multi-connectivity usage in order to improve the overall network performance.

The steering signals can comprise the following commands for the at least one multi-connectivity units 105a, 110a, 115a, 120a:

i) Deactivation Command:

The multi-connectivity units 105a, 110a, 115a, 120a are requested to deactivate at least one of the multi-connectivity setups. This can be done by sending the appropriate command to quit multi-connectivity usage to any of the multi-connectivity units 105a, 110a, 115a, 120a. Within the context of FIG. 5 this could lead to the deactivation of the Links 2-n between the RG 110 and the network provider 120 so that only the link 140a remains active.

Another possible command is to request to at least one of the multi-connectivity units 105a, 110a, 115a, 120a to switch off data aggregation—simultaneous use of multiple accesses. Still another possibility is to request at least one of the multi-connectivity units 105a, 110a, 115a, 120a to switch one of the actively used multi-connectivity paths in a "handover mode". In the context of this application, "handover mode" of data path means that this data path serves only as a backup if a parallel actively used data path suffers failure. These commands can be executed by the traffic scheduler 170.

ii) Bypass Command:

The steering signals comprise commands to redirect multi-connectivity UE 105 traffic through a fixed access (e.g. DSL) at a multi-connectivity capable RG 110. A possible technical implementation is to simply bypass the traffic at scheduler 170 of the RG 110. The appropriate commands can be executed by a processor of the RG 110. Of course is to be understood that this bypass command can also be applied between the other multi-connectivity devices shown in FIG. 5 or FIG. 6.

iii) Modification Commands:

Within the MPTCP standard, path estimation is done by using congestion control. Congestion control works on the principle that for every data packet that is sent and associated acknowledgment signal will be send back in a ping-pong like manner. The faster the acknowledgment signal is being received the more data traffic can be sent via the respective data path. In the case of cascaded multi-connectivity it causes problems that more than one congestion control are running nested, which can lead to an interference between those nested congestion controls. It also causes problems that more than one traffic scheduler 170 and/or more than one reordering unit 174 are running in chained or stacked.

Cascaded multi-connectivity interferences can lead to the effect that the acknowledgment signals takes longer to get back to the sender or that a do not reach the sender at all. The associated path estimation units then conclude that the respective data paths are overloaded and stop data transmission. Hence, the steering signals can comprise the command to deactivate congestion control and/or to deactivate path estimation in at least one of the multi-connectivity units 105a, 110a, 115a, 120a.

It is also possible to perform path estimation in another manner other than congestion control. Nevertheless, these other manners can be interfered with by cascaded multi-connectivity, too. Hence, the steering signals can comprise the command to deactivate path estimation in at least one of the multi-connectivity units 105a, 110a, 115a, 120a.

The steering signals can comprise commands to modify packet loss responsiveness/reliability and/or to modify the functionality of the reordering unit 174.

The steering signals can comprise commands to modify the functionality of the traffic scheduler 170. For example, the traffic scheduler 170 is requested to schedule all data packets to a single data path until it receives a new steering signal.

Of course, it is also possible to combine any of the commands described above when generating the steering signals.

iv) Denying Commands:

The steering signals can comprise commands to deny the forwarding of data packets belonging to a multi-connectivity service 115. For example, if a RG 110 does not forward MPTCP data packets from the service 115 to the UE 105, the UE notes that direct link 125 is basically useless and deactivates direct link 125.

v) Distributing Multi-Connectivity Information:

Typically, a MP-QUIC capable application is running on the user equipment 105. Typically, a network operator is not able to control the application, like the well-known YouTube app. For example, the YouTube app is end-to-end securely connected to the YouTube service in the Internet and cannot be modified by the network provider. However, if the user equipment 105, which itself communicates on a ATSSS basis, detects that the application uses the MP-QUIC, a detection unit inside the user equipment 105 discovers potential cascaded multi-connectivity usage. There are in principle two mechanisms the user equipment 105 can execute to prevent multi-connectivity interferences. The first option is to deactivate its own ATSSS usage are to send a signal to the application that indicates that ATSSS is already used. The application could then react according to this signal entity and for example de-activate its own MP-QUIC usage.

Thus, embodiments of the invention provide methods to identify cascaded multi-connectivity connectivity and approaches to mitigate interference effects that can result from multi-connectivity connections.

However, still some performance tasks of the communication network 100 can remain to be solved: For example, if the different multi-connectivity connections are provided by more than one network operator, these network operators need to trust each other if one of the network operators sends a steering signal to the other operator to reduce its respective usage of multi-connectivity techniques. Hence, it is advantageous to establish protocols that guarantee that the steering signals have the appropriate "rights" to control the multi-connectivity usage. Another task is to evaluate the best measures to reduce multi-connectivity usage and at the same time enable the best possible network performance for the user equipment of the user. Due to the complex interactions of the different multi-connectivity protocols, it is a priori not obvious, which is the best mitigation technique against interference effects with respect to the best overall and/or individual network performance.

Figure 8:
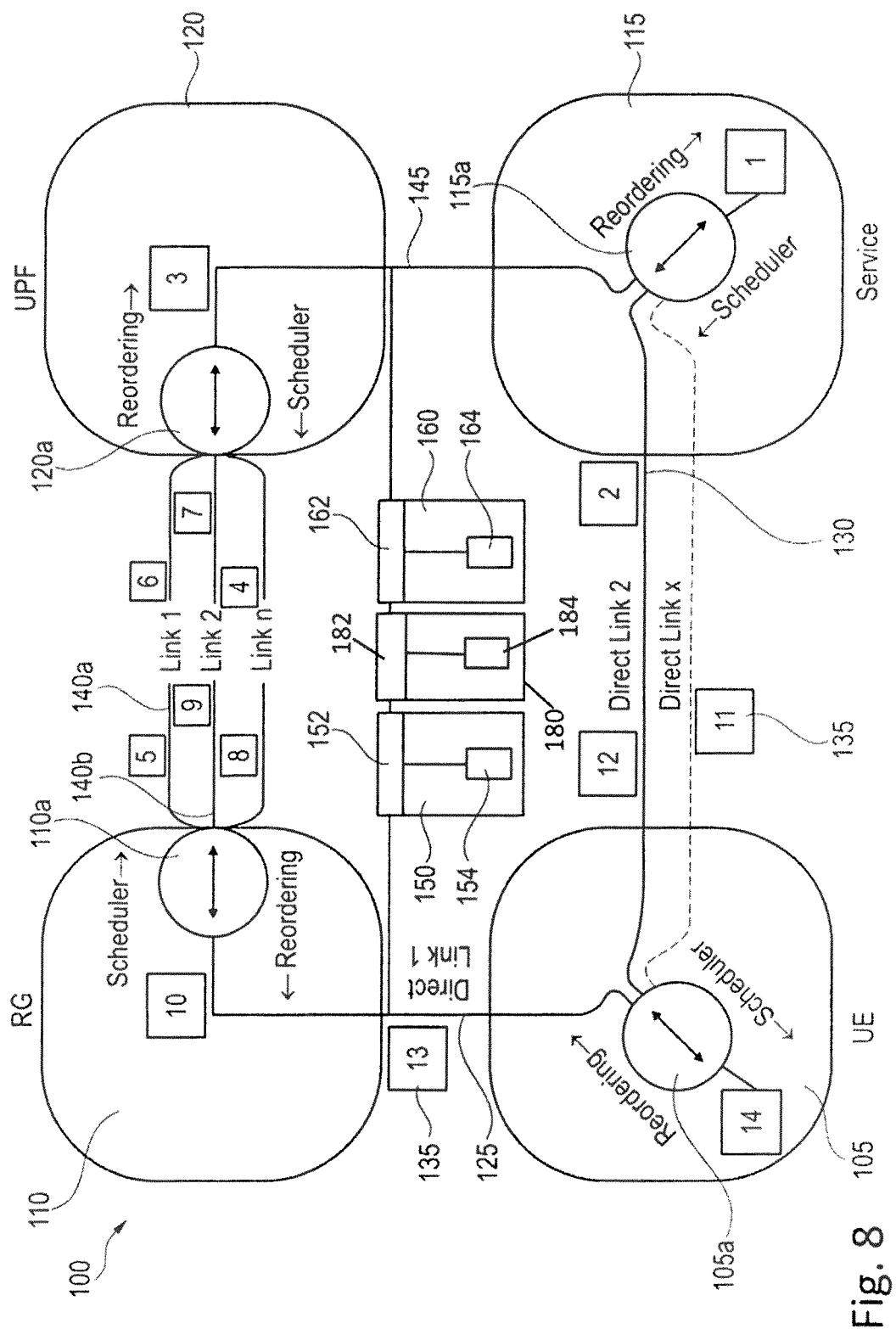
FIG. 8 shows the multi-connectivity environment of FIG. 5 with an additional verification unit.

FIG. 8 shows techniques to evaluate the different mitigation techniques and to verify which of the possible counter measurements shows best results. The setup of FIG. 8 allows for a fine tuning of those mitigation techniques to optimize network traffic with respect to different parameters like bandwidth, error rate, latency, RTT, current time, etc.

To summarize the possible mitigation techniques once again:
Deactivate/activate
  one of the multi-connectivity set-ups;
  steering modes, e.g. switch of aggregation;
Bypass
  UE MC traffic is redirected through fixed accesses at MC capable RG;
Modify
  congestion control;
  path estimation;
  packet loss responsiveness/reliability;
  scheduling;
  re-assembly;
Deny forwarding of packets belonging to a MC service;
Inform other MC solutions about own existence.

In principle those mitigation techniques can be applied in any combination, and it can also possible to adjust internal parameters of at least some of those mitigation techniques. This adjustment of internal parameters can also be described as fine-tuning of the respective mitigation technique. This shows that it is possible to choose one technique out of possibly a few thousands or more mitigation techniques. Of course, this leads to the questions which of those mitigation techniques will be the best.

A possibility to gain knowledge about the performance of at least a subset of those mitigation techniques is to implement a verification unit 180 in the communication network as shown in FIG. 8. The verification unit 180 shows a communication interface 182 to communicate with the communication network 100. In addition, the verification unit 180 as a processor unit 184 to perform calculations, in particular to execute algorithms. The verification unit 180 is configured to monitor the effect of the mitigation techniques which are applied if a cascaded multi-connectivity usage is detected. The steering signal of the controlling unit 160 triggers a certain mitigation technique (also specified as a counter measurement), which changes certain parameters of the network traffic.

At least some of those parameters can be measured by the verification unit 180. An algorithm implemented in the verification unit 180 can evaluate the degree of effectiveness of the network data traffic by evaluating those parameters. If a feedback loop is implemented between the controlling unit 160 and the verification unit 180, it is possible to evaluate the best mitigation technique.

For example, this can be done as follows: the controlling unit 160 chooses a first mitigation technique and the verification unit 180 evaluates a first effectiveness. Then the controlling unit 160 chooses a second mitigation technique and the verification unit 180 evaluates a second effectiveness. In the next step, the first and the second effectiveness can be compared by an algorithm to evaluate which one has the better effectiveness. If the mitigation technique with the better effectiveness is found, then the controlling unit 160 sends steering signal of the mitigation technique with the better effectiveness. Of course, this feedback loop can be performed with any number of the possible mitigation techniques. The algorithm can be implemented on the controlling unit 160 or on the verification unit 180. In principle it is possible to integrate the verification unit 180 in the controlling unit 160.

The following parameters can be assessed to evaluate the effectiveness and/or the performance of the communication network 100: available bandwidth, used bandwidth, error rate, latency, RTT, and/or current time etc. The measurement of those parameters need not to be performed by the verification unit 180 but can be measured with different measurement units distributed inside the communication network 100. In this case, the measurement results are communicated over the communication network to the verification unit 180.

Artificial intelligence that uses machine learning algorithms can be implemented on the verification unit 180 to calculate the best mitigation technique of a specific data traffic situation within the communication network 100. The algorithms of the artificial intelligence can be pre-trained, can learn and/or can improve during the verification process.

In addition, an evaluation of performance verification measurements that have been evaluated in the past can be stored within a memory of the verification unit 180. In order to choose the best mitigation techniques, the algorithm, in particular the artificial intelligence algorithm, can take those "historic" data into account. It is also possible to train the artificial intelligence with those historical data.

In principle it is possible to distribute the controlling unit 160, the detection unit 150 and the verification unit 180 as individual units within the network or to combine them into one functional unit.

Of course, the teaching of the verification unit 180 is not limited to the embodiment of FIG. 8 but can be applied in any cascaded multi-connectivity scenario.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 communication network
105, 110, 115, 120 network devices
105a, 110a, 115a, 120a multi-connectivity unit
105 smartphone
110 RG
115 service
120 network provider
122 second network provider
125 first direct link 130 second direct link
135 data packets
140a, 140b two links
140a fixed line link
140b cellular link
145 remote link,
150 detection unit
152 communication interface of detection unit
154 processor of detection unit
160 controlling unit
162 communication interface of controlling unit
164 processor of controlling unit
170 traffic scheduler
172 path information unit
174 reordering unit
180 verification unit
182 communication interface
184 processor unit

The invention claimed is:

1. A multi-connectivity detector to discover cascaded multi-connectivity scenarios in a communication network, the multi-connectivity detector comprising an interface and an evaluation unit, and at least one processor and a memory storing instructions that when executed by the processor, cause the multi-connectivity detector to:
discover the cascaded multi-connectivity scenarios, in the communication network, wherein the cascaded multi-connectivity scenarios comprise possible combinations of multi-connectivity connections as i) a multi-connectivity end-to-end implementation, ii) a multi-connectivity implementation between a user equipment (UE) and a multi-connectivity provider, which provides an interface towards services in the Internet; and/or iii) a multi-connectivity implementation between a residential gateway (RG) and the multi-connectivity provider connecting an RG connected UE and an Internet service, and
wherein a combination of the different multi-connectivity approaches leads to a chain of multi-connectivity scenarios in a row or to a stacked arrangement,
where the processor causes the interface of the multi-connectivity detector to:
communicate with the communication network, wherein one or multiple multi-connectivity devices of the communication network send a plurality of transmission signals to the interface, wherein the plurality of transmission signals comprise information about used multi-connectivity techniques;
and the processor further causes the evaluation unit to:
analyze the occurrences and/or a possible occurrences of cascaded multi-connectivity usage within the communication network based on the plurality of transmission signals, wherein the evaluation unit is programmed with a cascaded multi-connectivity detection algorithm, and wherein the evaluation unit is provided with the plurality of transmission signals.

2. The multi-connectivity detector of claim 1, wherein the multi-connectivity detector is allocated to one or more multi-connectivity devices corresponding to the multi-connectivity scenarios and/or is implemented as an independent entity within the communication network.

3. The multi-connectivity detector of claim 2, wherein the multi-connectivity detector is implemented in the UE, in a network operator server, in the RG and/or in a network service.

4. The multi-connectivity detector of claim 1, wherein the plurality of transmission signals of multipath transmission differ from the plurality of transmission signals of single path transmission.

5. The multi-connectivity detector of claim 1, wherein the multi-connectivity detector is configured to send a cascaded multi-connectivity signal via the interface to the communication network upon the detection of cascaded multi-connectivity by the cascaded multi-connectivity detection algorithm.

6. A method to discover cascaded multi-connectivity scenarios in a communication network, wherein the method is performed by the multi-connectivity detector disclosed by claim 1, the method comprising the following steps:
discovering cascaded multi-connectivity scenarios, in the communication network, wherein the cascaded multi-connectivity scenarios comprise possible combinations of multi-connectivity connections as i) a multi-connectivity end-to-end implementation, ii) a multi-connectivity implementation between a user equipment (UE) and a multi-connectivity provider, which provides an interface towards services in the Internet, and/or iii) a multi-connectivity implementation between a residential gateway (RG) and the multi-connectivity provider connecting an RG connected UE and an Internet service, and wherein a combination of the different multi-connectivity approaches leads to a chain of multi-connectivity scenarios in a row or to a stacked arrangement,
receiving, by the multi-connectivity detector, a plurality of transmission signals from at least one or multiple multi-connectivity devices, wherein the plurality of transmission signals comprise information about used multi-connectivity techniques; and
analyzing, by the multi-connectivity detector, when the plurality of transmission signals indicate usage of the cascaded multi-connectivity within the communication network.

7. A multi-connectivity communication network configured to establish data traffic between network devices, the multi-connectivity communication network comprising:
at least two multi-connectivity devices, wherein each of the at least two multi-connectivity devices comprises multi-connectivity systems and transmits data via the multi-connectivity communication network;
a controller to send steering signals to at least one of the multi-connectivity systems; and
a multi-connectivity detector according to claim 1 to discover cascaded multi-connectivity scenarios in the multi-connectivity communication network, wherein the multi-connectivity detector sends a cascaded multi-connectivity signal via an interface to the controller, and wherein the multi-connectivity detector sends the cascaded multi-connectivity signal upon detection of the cascaded multi-connectivity scenarios;
wherein an algorithm of the controller generates the steering signals based on the multi-connectivity signal.

8. The multi-connectivity communication network of claim 7, wherein the multi-connectivity systems comprise a traffic scheduler, a path information unit, and/or a reordering unit.

9. The multi-connectivity communication network of claim 7, wherein the network devices are a user equipment, a residential gateway, and/or servers.

10. The multi-connectivity communication network of claim 7, wherein the steering signals are sent to selected multi-connectivity devices or to all selected multi-connectivity devices of the network.

11. The multi-connectivity communication network of claim 7, wherein the steering signals comprise information to reduce the usage of multi-connectivity techniques within the multi-connectivity communication network.

12. A method to control usage of multi-connectivity techniques in a multi-connectivity communication network and the method performed in the multi-connectivity communication network disclosed by claim 7, the method comprising the following steps:
- establishing a communication network between network devices, wherein at least two of the network devices are multi-connectivity devices;
- transmitting a plurality of transmission signals from at least one or multiple multi-connectivity devices to a multi-connectivity detector of the multi-connectivity communication network, wherein the plurality of transmission signals comprise information about used multi-connectivity techniques;
- analyzing by the multi-connectivity detector when the plurality of transmission signals indicate usage of cascaded multi-connectivity within the communication network;
- sending a cascaded multi-connectivity signal upon detection of cascaded multi-connectivity scenarios by the multi-connectivity detector to a controller; and
- generating of steering signals based on the multi-connectivity signal by the controller, wherein the controller sends the steering signals to at least one of the multi-connectivity devices; wherein the at least one of the multi-connectivity devices adapts multi-connectivity activity to increase communication network performance based on the steering signals.

13. The method of claim 12, wherein the multi-connectivity activity is adapted to increase the communication network performance.

14. The method of claim 12, wherein the multi-connectivity activity is deactivated, bypassed, and/or modified.

* * * * *